US012626530B2

(12) United States Patent
Ishii

(10) Patent No.: US 12,626,530 B2
(45) Date of Patent: May 12, 2026

(54) JOINT DETECTION APPARATUS, LEARNING-MODEL GENERATION APPARATUS, JOINT DETECTION METHOD, LEARNING-MODEL GENERATION METHOD, AND COMPUTER READABLE RECORDING MEDIUM

(71) Applicant: NEC Corporation, Tokyo (JP)

(72) Inventor: Asuka Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 18/273,930

(22) PCT Filed: Feb. 1, 2022

(86) PCT No.: PCT/JP2022/003766
§ 371 (c)(1),
(2) Date: Jul. 24, 2023

(87) PCT Pub. No.: WO2022/181252
PCT Pub. Date: Sep. 1, 2022

(65) Prior Publication Data
US 2024/0078832 A1 Mar. 7, 2024

(30) Foreign Application Priority Data
Feb. 26, 2021 (JP) ................................. 2021-029411

(51) Int. Cl.
*G06V 40/10* (2022.01)
*G06T 7/73* (2017.01)
(52) U.S. Cl.
CPC .............. *G06V 40/107* (2022.01); *G06T 7/73* (2017.01); *G06T 2207/20084* (2013.01); *G06T 2207/30196* (2013.01)

(58) Field of Classification Search
CPC .. G06V 40/107; G06V 40/103; G06V 10/774; G06V 10/82; G06T 7/73; G06T 2207/20084; G06T 2207/3019; G06T 7/00
See application file for complete search history.

(56) References Cited

U.S. PATENT DOCUMENTS 11,112,875 B1 * 9/2021 Zhou ........................ G06F 3/017
11,841,920 B1 * 12/2023 Marsden ................ G06N 3/045
(Continued)

FOREIGN PATENT DOCUMENTS

JP       2007-004732 A       1/2007
JP       2017-191576 A       10/2017
WO       2020/000096 A1      1/2020

OTHER PUBLICATIONS

English translation of Written opinion for PCT Application No. PCT/JP2022/003766, mailed on May 10, 2022.
(Continued)

*Primary Examiner* — Tom Y Lu
(74) *Attorney, Agent, or Firm* — Sughrue Mion, PLLC

(57) ABSTRACT

A learning-model generation apparatus 10 includes: an all-feature-amount-outputting unit that output, from image data of an object and for each joint of the object, a feature amount representing the joint; a feature-amount-generating unit that generates, from the feature amounts of the individual joints of the object and as training feature amounts, feature amounts in a case in which the feature amount of a certain joint is missing; and a learning-model-generating unit that, by using training data including the generated training feature amounts, generates a machine learning model by machine-learning positional relationships between the other joints in the case in which the feature amount of the certain joint is missing.

9 Claims, 10 Drawing Sheets

(56)                    References Cited

U.S. PATENT DOCUMENTS

| 12,299,920 | B2 * | 5/2025 | Xiang | G06T 7/73 |
|---|---|---|---|---|
| 2020/0372246 | A1 * | 11/2020 | Chidananda | G06N 3/084 |
| 2022/0291755 | A1 * | 9/2022 | Lu | G06V 40/28 |
| 2023/0116029 | A1 * | 4/2023 | Jiang | G06V 40/11 |
| | | | | 382/103 |
| 2023/0214458 | A1 * | 7/2023 | Marsden | G06V 40/28 |
| | | | | 382/157 |

OTHER PUBLICATIONS

JP Office Action for JP Application No. 2023-502225, mailed on Nov. 12, 2024 with English Translation.
International Search Report for PCT Application No. PCT/JP2022/003766, mailed on May 10, 2022.
Christian Zimmermann, Thomas Brox, "Learning to Estimate 3D Hand Pose from Single RGB Images", [online], University of Freiburg, [retrieved on Feb. 8, 2021], Internet: <URL: https://openaccess.thecvf.com/content_ICCV_2017/papers/Zimmermann_Learning_to_Estimate_ICCV_2017_paper.pdf>.
Wang, Hongsong et al., "Modeling Temporal Dynamics and Spatial Configurations of Actions Using Two-Stream Recurrent Neural Networks", CVPR 2017 open access, 2017, pp. 499-508 entire text.

* cited by examiner

JOINT DETECTION APPARATUS, LEARNING-MODEL GENERATION APPARATUS, JOINT DETECTION METHOD, LEARNING-MODEL GENERATION METHOD, AND COMPUTER READABLE RECORDING MEDIUM

This application is a National Stage Entry of PCT/JP2022/003766 filed on Feb. 1, 2022, which claims priority from Japanese Patent Application 2021-029411 filed on Feb. 26, 2021, the contents of all of which are incorporated herein by reference, in their entirety.

TECHNICAL FIELD

The present invention relates to a joint detection apparatus and a joint detection method for detecting joints of a living body from an image, and further relates to a computer readable recording medium that includes recorded thereon a program for realizing the joint detection apparatus and the joint detection method. Furthermore, the invention relates to a learning-model generation apparatus and a learning-model generation method for generating a learning model for detecting joints of a living body from an image, and further relates to a computer readable recording medium that includes recorded thereon a program for realizing the learning-model generation apparatus and the learning-model generation method.

BACKGROUND ART

In recent years, systems for estimating human pose from images have been proposed. Such systems are expected to be used in fields such as video monitoring and user interfaces. For example, an image monitoring system capable of estimating human pose would make it possible to estimate what a person captured by a camera is doing, and monitoring accuracy can thus be improved. Furthermore, a user interface capable of estimating human pose would make it possible to perform input via gestures.

For example, Non-Patent Document 1 discloses a system for estimating human pose, or more specifically, the pose of a human hand from images. The system disclosed in Non-Patent Document 1 first acquires image data including an image of a hand, and then inputs the acquired image data to a neural network that has performed machine learning of image feature amounts of individual joints and causes the neural network to output, for each joint, a heat map that represents the likelihood of presence of the joint via color and density.

Subsequently, the system disclosed in Non-Patent Document 1 inputs the output heat maps to a neural network that has performed machine learning of the relationships between joints and corresponding heat maps. Furthermore, a plurality of such neural networks are prepared, and the results output from one neural network is input to another neural network. Thus, the positions of joints on heat maps are refined.

In addition, Patent Document 1 also discloses a system for estimating hand pose from images. Similarly to the system disclosed in Non-Patent Document 1, the system disclosed in Patent Document 1 also estimates coordinates of joints using a neural network.

LIST OF RELATED ART DOCUMENTS

Patent Document

Patent Document 1: Japanese Patent Laid-Open Publication No. 2017-191576

Non-Patent Document

Non-Patent Document 1: Christian Zimmermann, Thomas Brox, "Learning to Estimate 3D Hand Pose from Single RGB Images", [online], University of Freiburg, [retrieved on Feb. 8, 2021], Internet: <URL: https://openaccess.thecvf.com/content_ICCV_2017/papers/Zimmermann_Learning_to_Estimate_ICCV_2017_paper.pdf>

SUMMARY OF INVENTION

Problems to be Solved by the Invention

While coordinates of joints of a human hand can be estimated from an image as described above by using the systems disclosed in Non-Patent Document 1 and Patent Document 1, these systems are problematic in that estimation accuracy decreases as described in the following.

First of all, some of the many joints that a living body has may not be visible in an image. In such a case, with the systems disclosed in Non-Patent Document 1 and Patent Document 1, the joints that are not visible in the image may be located at incorrect positions in the heat maps. Furthermore, due to this, when the positions of joints are refined by neural networks, even the joints that are visible in the image are positioned incorrectly as a result of being dragged by the incorrect positions of the joints that are not visible in the image.

An example object of the invention is to provide a joint detection apparatus, a learning-model generation apparatus, a joint detection method, a learning-model generation method, and a computer readable recording medium with which the accuracy of the estimation of joint positions can be improved.

Means for Solving the Problems

In order to achieve the above-described object, a joint detection apparatus includes:
  an all-feature-amount-outputting unit that outputs, from image data of an object and for each joint of the object, a first feature amount representing the joint; and
  a partial-feature-amount-outputting unit that receives input of the first feature amounts of the individual joints of the object, and, for each joint of the object, outputs a second feature amount representing the joint using a machine learning model that has performed machine learning of positional relationships between other joints in cases in which a feature amount of a certain joint is missing.
In order to achieve the above-described object, a learning-model generation apparatus includes:
  an all-feature-amount-outputting unit that outputs, from image data of an object and for each joint of the object, a feature amount representing the joint;
  a feature-amount-generating unit that generates, from the feature amounts of the individual joints of the object and as training feature amounts, feature amounts in a case in which the feature amount of a certain joint is missing; and a learning-model-generating unit that, by using training data including the generated training feature amounts, generates a machine learning model by machine-learning positional relationships between the other joints in the case in which the feature amount of the certain joint is missing.

In order to achieve the above-described object, a joint detection method includes:

an all-feature-amount-outputting step of outputting, from image data of an object and for each joint of the object, a first feature amount representing the joint; and a partial-feature-amount-outputting step of receiving input of the first feature amounts of the individual joints of the object, and, for each joint of the object, outputting a second feature amount representing the joint using a machine learning model that has performed machine learning of positional relationships between other joints in cases in which a feature amount of a certain joint is missing.

In order to achieve the above-described object, a learning-model generation method includes:

an all-feature-amount-outputting step of outputting, from image data of an object and for each joint of the object, a feature amount representing the joint;

a feature-amount-generating step of generating, from the feature amounts of the individual joints of the object and as training feature amounts, feature amounts in a case in which the feature amount of a certain joint is missing; and a learning-model-generating step of, by using training data including the generated training feature amounts, generating a machine learning model by machine-learning positional relationships between the other joints in the case in which the feature amount of the certain joint is missing.

In order to achieve the above-described object, a first computer readable recording medium according to an example aspect of the invention is a computer readable recording medium that includes recorded thereon a program, the program including instructions that cause the computer to carry out:

an all-feature-amount-outputting step of outputting, from image data of an object and for each joint of the object, a first feature amount representing the joint; and a partial-feature-amount-outputting step of receiving input of the first feature amounts of the individual joints of the object, and, for each joint of the object, outputting a second feature amount representing the joint using a machine learning model that has performed machine learning of positional relationships between other joints in cases in which a feature amount of a certain joint is missing.

In order to achieve the above-described object, a second computer readable recording medium according to an example aspect of the invention is a computer readable recording medium that includes recorded thereon a program, the program including instructions that cause the computer to carry out:

an all-feature-amount-outputting step of outputting, from image data of an object and for each joint of the object, a feature amount representing the joint;

a feature-amount-generating step of generating, from the feature amounts of the individual joints of the object and as training feature amounts, feature amounts in a case in which the feature amount of a certain joint is missing; and a learning-model-generating step of, by using training data including the generated training feature amounts, generating a machine learning model by machine-learning positional relationships between the other joints in the case in which the feature amount of the certain joint is missing.

Advantageous Effects of the Invention

As described above, according to the invention, it is possible to improve the accuracy of the estimation of joint positions.

EXAMPLE EMBODIMENT

First Example Embodiment

First, in a first example embodiment, a learning-model generation apparatus, a learning-model generation method, and a program for generating a learning model will be described with reference to FIGS. 1 to 5.

[Apparatus Configuration]

Figure 1:
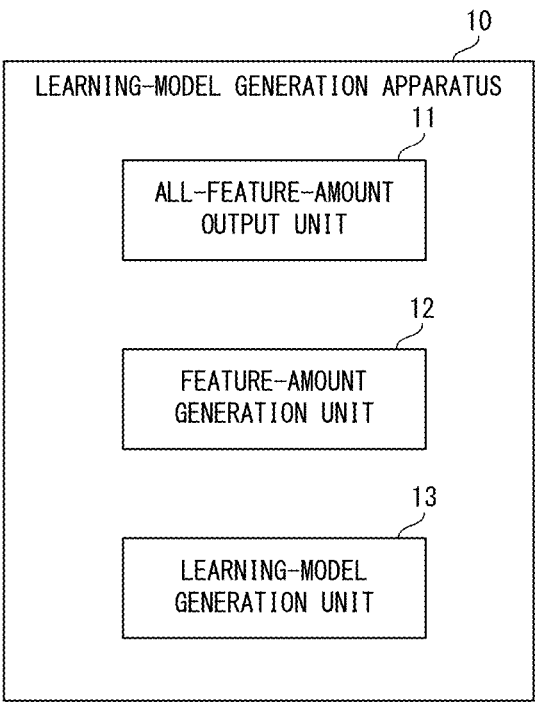
FIG. 1 is a configuration diagram illustrating the schematic configuration of the learning-model generation apparatus in the first example embodiment.

First, a schematic configuration of the learning-model generation apparatus in the first example embodiment will be described with reference to FIG. 1. FIG. 1 is a configuration diagram illustrating the schematic configuration of the learning-model generation apparatus in the first example embodiment.

A learning-model generation apparatus 10 in the first example embodiment illustrated in FIG. 1 is an apparatus that generates a machine learning model for detecting joints. As illustrated in FIG. 1, the learning-model generation apparatus 10 includes an all-feature-amount output unit 11, a feature-amount generation unit 12, and a learning-model generation unit 13.

The all-feature-amount output unit 11 outputs, from image data of an object and for each joint of the object, a feature amount representing the joint. The feature-amount generation unit 12 generates, from the feature amounts of the individual joints of the object, feature amounts in a case in which a feature amount of a certain joint is missing, as training feature amounts.

The learning-model generation unit 13, by using training data including the generated training feature amounts, generates a machine learning model by machine-learning positional relationships between the other joints in the case in which the feature amount of the certain joint is missing.

In such a manner, in the first example embodiment, training feature amounts used as training data are feature amounts in cases in which a feature amount of a certain joint is set to a missing state. Thus, if joints are detected using the generated machine learning model, joints of an object can be estimated accurately even if a certain joint of the object is not visible in an image.

Figure 2:
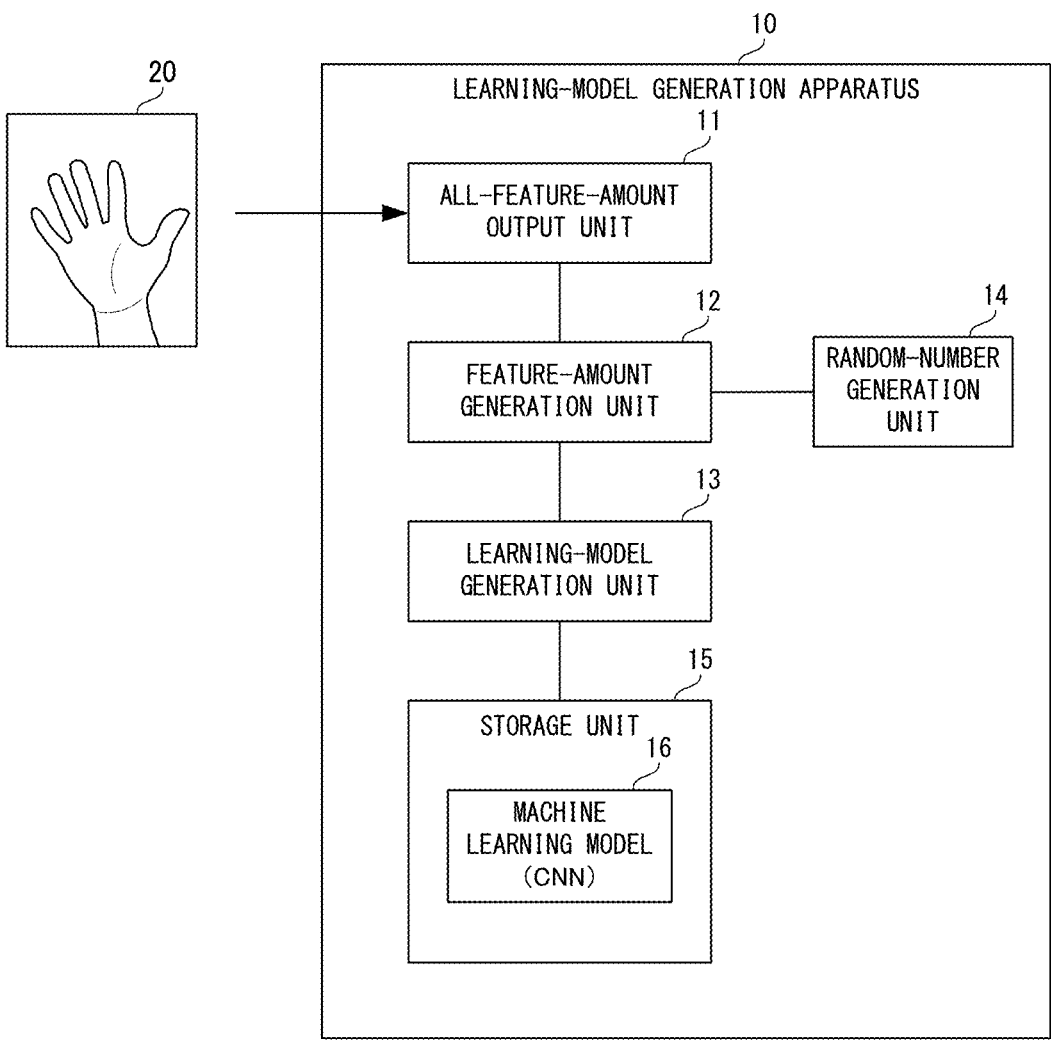
FIG. 2 is a block diagram illustrating the configuration of the learning-model generation apparatus in the first example embodiment in detail.
Figure 3:
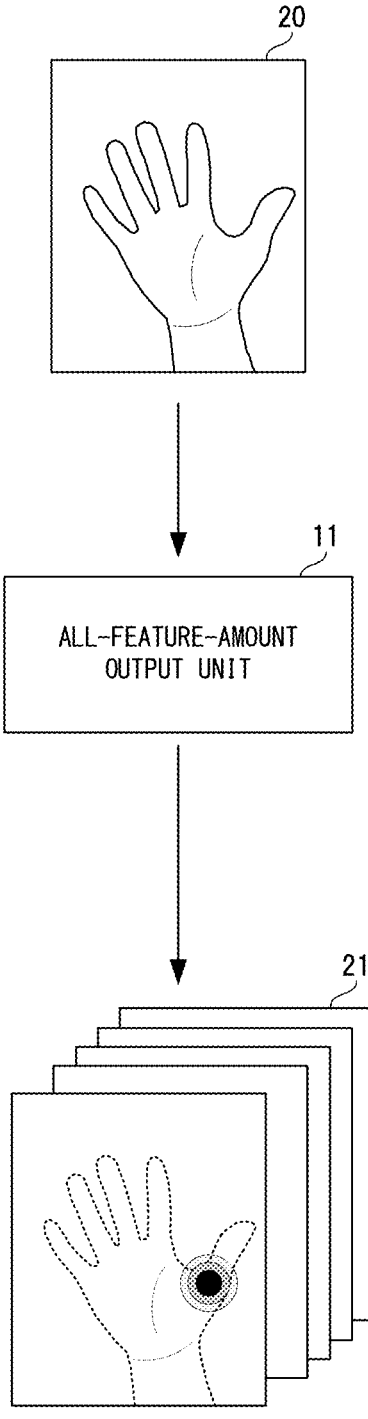
FIG. 3 is a diagram describing the function of the all-feature-amount output unit in the first example embodiment.
Figure 4:
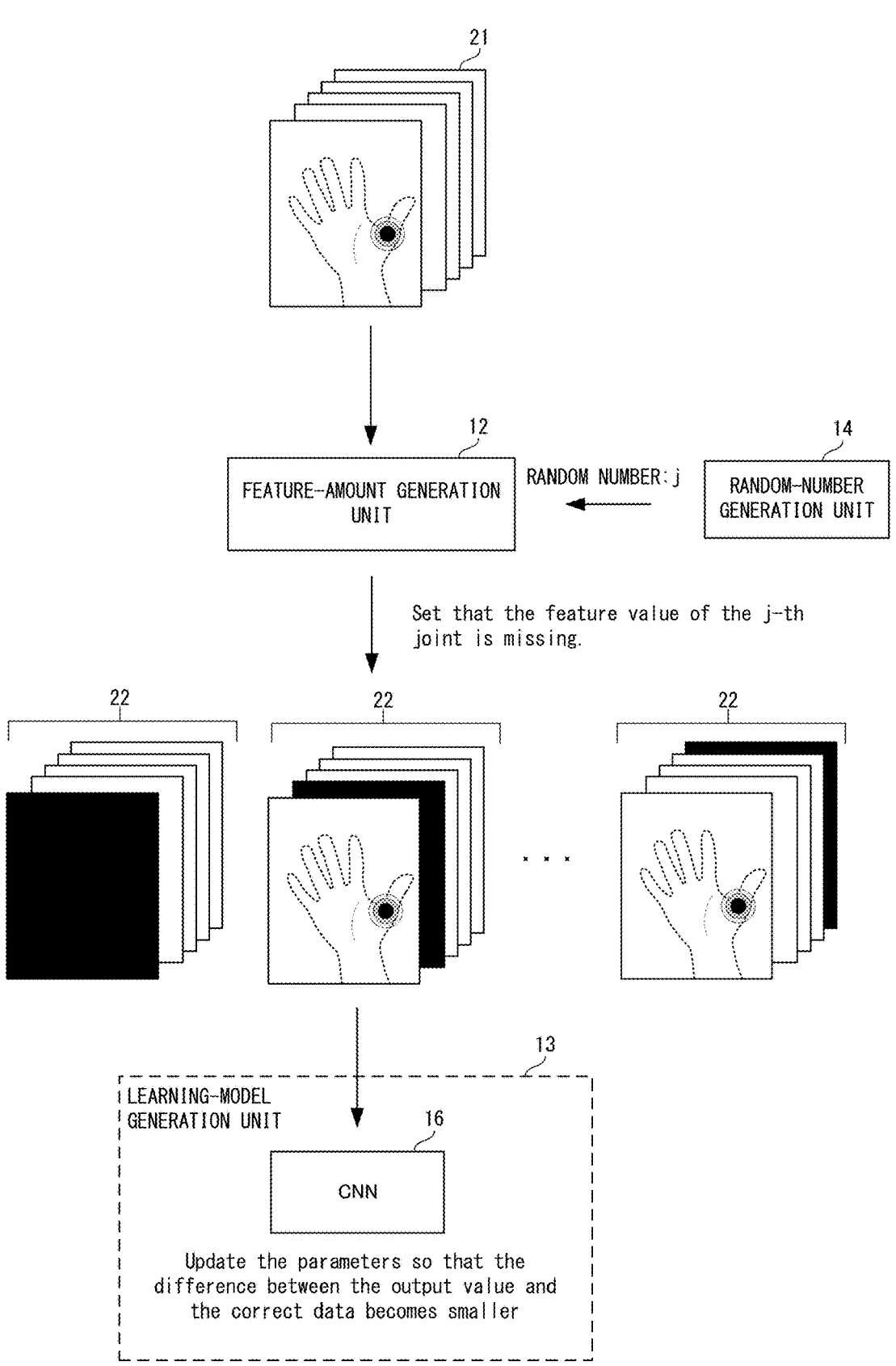
FIG. 4 is a diagram describing the functions of the feature-amount generation unit and the learning-model generation unit in the first example embodiment.

Subsequently, the configuration and functions of the learning-model generation apparatus in the first example embodiment will be described in detail with reference to FIGS. 2 to 4. FIG. 2 is a block diagram illustrating the configuration of the learning-model generation apparatus in the first example embodiment in detail. FIG. 3 is a diagram describing the function of the all-feature-amount output unit in the first example embodiment. FIG. 4 is a diagram describing the functions of the feature-amount generation unit and the learning-model generation unit in the first example embodiment.

As illustrated in FIG. 2, in the example embodiment, the learning-model generation apparatus 10 includes a random-number generation unit 14 and a storage unit 15 in addition to the all-feature-amount output unit 11, the feature-amount generation unit 12, and the learning-model generation unit 13 described above.

The random-number generation unit 14 generates random numbers within a preset range, and inputs the generated random numbers to the feature-amount generation unit 12. Processing performed by the feature-amount generation unit 12 using the random numbers will be described later. The storage unit 15 stores a machine learning model 16 generated by the learning-model generation unit 13.

Furthermore, in the example embodiment, the machine learning model 16 is constructed using a convolutional neural network (CNN). In the example embodiment, the learning-model generation unit 13 generates the machine learning model by updating the initial values of parameters of the CNN through learning. In the following, machine learning models are also referred to as "CNNs".

Furthermore, in the following, description will be provided taking as an example a case in which the object is a human hand. Note that, in the first example embodiment, the object is not limited to a human hand, and may be an entire human body or other parts. As long as the object has joints, the object may be an object other than a human, such as a robot for example. Furthermore, in the first example embodiment, portions other than joints (e.g., characteristic portions such as fingertips) may be detected in addition to joints.

In addition, in the first example embodiment, heat maps are used as feature amounts. A heat map is a map representing the likelihood that a joint in an image is present, and, for example, can represent the likelihood of the presence of a joint by color density. Note that feature amounts other than heat maps, such as coordinate values for example, may be used.

In the first example embodiment, the all-feature-amount output unit 11 first acquires image data 20 of an object. Then, from the image data 20, the all-feature-amount output unit 11 outputs heat maps 21 as feature amounts representing joints, as illustrated in FIG. 3. In the example in FIG. 3, a plurality of heat maps 21 for the individual joints in the image data 20 are output.

Specifically, the all-feature-amount output unit 11 outputs heat maps 21 by using a machine learning model that has learned the relationships between heat maps and joints in images, and inputting image data to this machine learning model, for example. A CNN can be mentioned as the machine learning model to be used in this case as well. Furthermore, in the machine learning of this CNN, image data of joints and heat maps that are correct answers are used as training data. Furthermore, the machine learning of the CNN is performed by updating parameters so as to reduce the difference between the output results (heat maps) regarding image data used as training data and the corresponding heat maps that are the correct answers.

In the example embodiment, from the heat maps 21 of the individual joints of the object, the feature-amount generation unit 12 generates, as a training feature amount set 22 for each of a plurality of certain joints, a set of feature amounts in which only the feature amount of the certain joint is set to a missing state.

Specifically, as illustrated in FIG. 4, the feature-amount generation unit 12 first receives a random number from the random-number generation unit 14. Then, the feature-amount generation unit 12 sets the feature amount of a jth joint indicated by the random number to a missing state by setting data on the heat map of the jth joint, among the plurality of heat maps 21 generated for the individual joints in the image, to 0 or 1. Thus, a set of feature amounts (training feature amount set) 22 in which only the heat map of the jth joint, among the plurality of heat maps 21 generated for the individual joints in the image, is set to a missing state is generated. Note that a number is assigned to each joint in advance.

Furthermore, while each of the feature amounts of the plurality of joints is set to a missing state in accordance with the random numbers that are generated in the example in FIG. 4, there is no limitation to this, and one or more joints the feature amounts of which are to be set to a missing state may be set in advance. Also, the feature-amount generation unit 12 may sequentially set the feature amount of each one of the plurality joints to a missing state, and generate training feature amount sets 22 corresponding to the number of joints. Note that, in the example in FIG. 4, the training feature amount sets 22 are referred to as "training heat map sets 22" because the training feature amounts are also heat maps.

In the example embodiment, the learning-model generation unit 13 generates a machine learning model by performing, for each of the plurality of certain joints, machine learning of the positional relationships between the other joints in a case in which the heat map of the certain joint is missing using training data including the corresponding training heat map set.

Specifically, as illustrated in FIG. 4, the learning-model generation unit 13 acquires the CNN 16 from the storage unit 15, inputs selected training heat map sets 22 to the CNN 16, and calculates differences between heat map sets that are the output results and the corresponding correct-answer heat maps. Note that the correct-answer heat maps are prepared in advance. Furthermore, for heat maps having been set to a state in which feature amounts are missing, the difference will not be calculated or a heat map in which no feature amount is present is used as a correct-answer heat map.

Then, the learning-model generation unit 13 updates the parameters of the CNN 16 so that the calculated differences are minimized, and stores the CNN 16 with the updated parameters to the storage unit 15. Furthermore, the learning-model generation unit 13 executes this processing until there are no unselected training heat map sets 22. Consequently, a CNN that can be used to detect joints is generated.

[Apparatus Operations]

Figure 5:
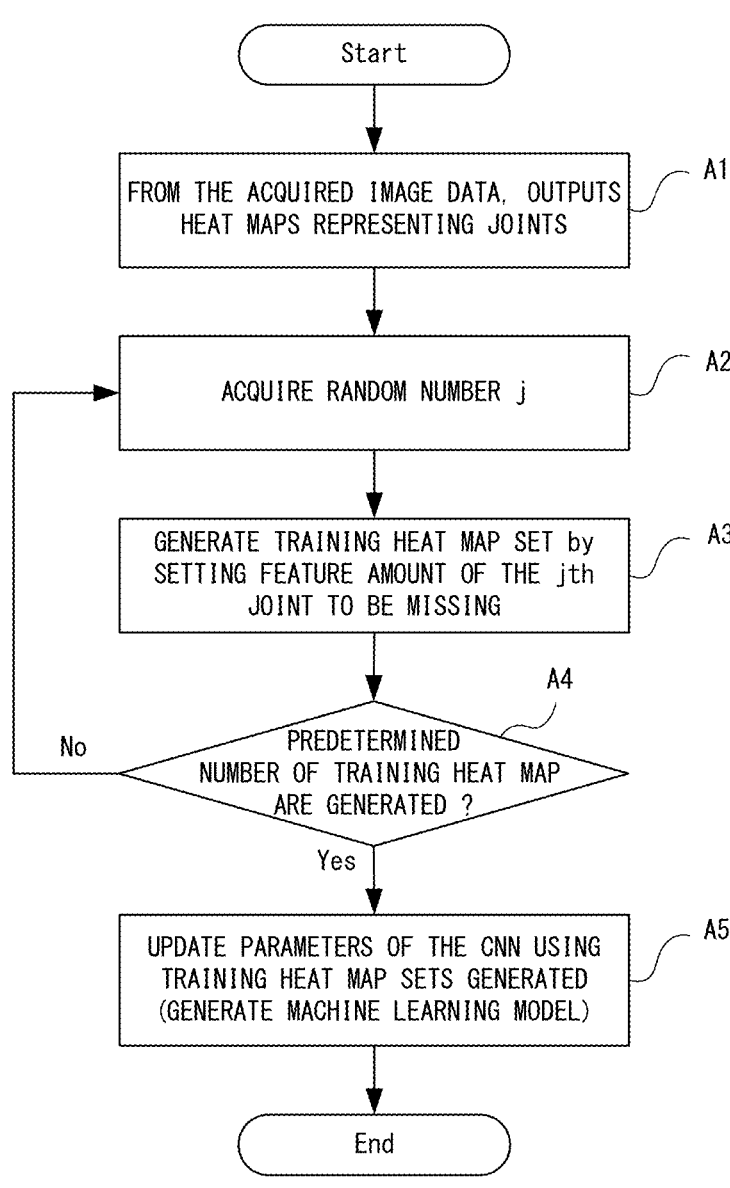
FIG. 5 is a flowchart illustrating the operations of the learning-model generation apparatus in the first example embodiment.

Next, operations of the learning-model generation apparatus 10 in the first example embodiment will be described with reference to FIG. 5. FIG. 5 is a flowchart illustrating the operations of the learning-model generation apparatus in the first example embodiment. FIGS. 1 to 4 will be referred to as needed in the following description. Furthermore, in the first example embodiment, a learning-model generation method is implemented by causing the learning-model generation apparatus 10 to operate. Accordingly, the following description of the operations performed by the learning-model generation apparatus 10 is substituted for the description of the learning-model generation method in the first example embodiment.

As illustrated in FIG. 5, the all-feature-amount output unit 11 first acquires image data 20 of an object, and, from the acquired image data 20, outputs heat maps 21 as feature amounts representing joints (step A1).

Next, the feature-amount generation unit 12 acquires a random number j generated by the random-number generation unit 14 (step A2). Subsequently, from the heat maps 21 of the individual joints output in step A1, the feature-amount generation unit 12 generates, as a training heat map set 22, a set of heat maps in which only the feature amount of the jth joint is set to a missing state, i.e., a set of heat maps in which only the heat map of the jth joint is set to 0 (or 1) (step A3).

Next, the feature-amount generation unit 12 determines whether or not a predetermined number of training heat map sets 22 have been generated (step A4). Furthermore, if the result of the determination in step A4 is that the predetermined number of training heat map sets 22 have not been generated (step A4: No), the feature-amount generation unit 12 executes step A2 again.

On the other hand, if the result of the determination in step A4 is that the predetermined number of training heat map sets 22 have been generated (step A4: Yes), the feature-amount generation unit 12 notifies the learning-model generation unit 13 that the generation of training heat map sets 22 is complete.

Upon receiving the notification, the learning-model generation unit 13 updates the parameters of the CNN 16 using the predetermined number of training heat map sets 22 generated in step A3 (step A5). Thus, a machine learning model is generated as a result of machine learning being performed of the positional relationships between other joints in cases in which heat maps of certain joints are missing. After step A5 is executed, the processing for generating a learning model is terminated.

As described above, in the first example embodiment, a training heat map set used as training data indicates feature amounts in a case in which a feature amount of a certain joint is missing. Thus, by detecting joints as described later using the generated CNN 16, joints of an object can be estimated accurately even if a certain joint of the object is not visible in an image.

[Program]

It suffices for the program for generating a learning model in the first example embodiment to be a program that causes a computer to carry out steps A1 to A5 illustrated in FIG. 5. By installing this program on a computer and executing the program, the learning-model generation apparatus and the learning-model generation method in the first example embodiment can be realized. In this case, one or more processors of the computer function and perform processing as the all-feature-amount output unit 11, the feature-amount generation unit 12, the learning-model generation unit 13, and the random-number generation unit 14.

Furthermore, in the first example embodiment, the storage unit 15 may be realized by storing data files constituting the storage unit 15 in a storage device such as a hard disk provided in the computer, or may be realized by a storage device provided in another computer. Furthermore, besides a general-purpose PC, a smartphone and a tablet-type terminal device can be mentioned as examples of the computer.

The program for generating a learning model in the first example embodiment may be executed by a computer system constructed from a plurality of computers. In this case, the computers may each function as one of the all-feature-amount output unit 11, the feature-amount generation unit 12, the learning-model generation unit 13, and the random-number generation unit 14, for example.

Second Example Embodiment

Subsequently, in a second example embodiment, a joint detection apparatus, a joint detection method, and a program for detecting joints will be described with reference to FIGS. 6 to 9.

[Apparatus Configuration]

Figure 6:
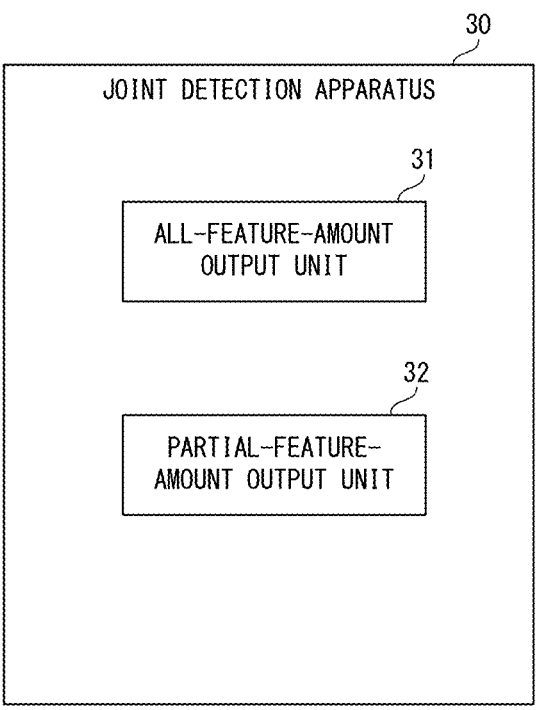
FIG. 6 is a configuration diagram illustrating the schematic configuration of the joint detection apparatus in the second example embodiment.

First, a schematic configuration of the joint detection apparatus in the second example embodiment will be described with reference to FIG. 6. FIG. 6 is a configuration diagram illustrating the schematic configuration of the joint detection apparatus in the second example embodiment.

A joint detection apparatus 30 in the second example embodiment illustrated in FIG. 6 is an apparatus for detecting joints of an object, such as a living body or a robot, for example. As illustrated in FIG. 6, the joint detection apparatus 30 includes an all-feature-amount output unit 31 and a partial-feature-amount output unit 32.

The all-feature-amount output unit 31 outputs, from image data of an object and for each joint of the object, a first feature amount representing the joint. The partial-feature-amount output unit 32 receives input of the first feature amounts of the individual joints of the object, and, for each joint of the object, outputs a second feature amount representing the joint using a machine learning model. The machine learning model is a machine learning model that has performed machine learning of positional relationships between other joints in cases in which a feature amount of a certain joint is missing.

In such a manner, in the second example embodiment, second feature amounts are output from first feature amounts representing joints using a machine learning model. The second feature amounts can appropriately indicate the positions of joints other than a certain joint in a case in which the certain joint is not visible because the machine learning model has performed machine learning of the positional relationships between joints other than the certain joint.

Thus, according to the second example embodiment, the accuracy of the estimation of joint positions can be improved.

Figure 7:
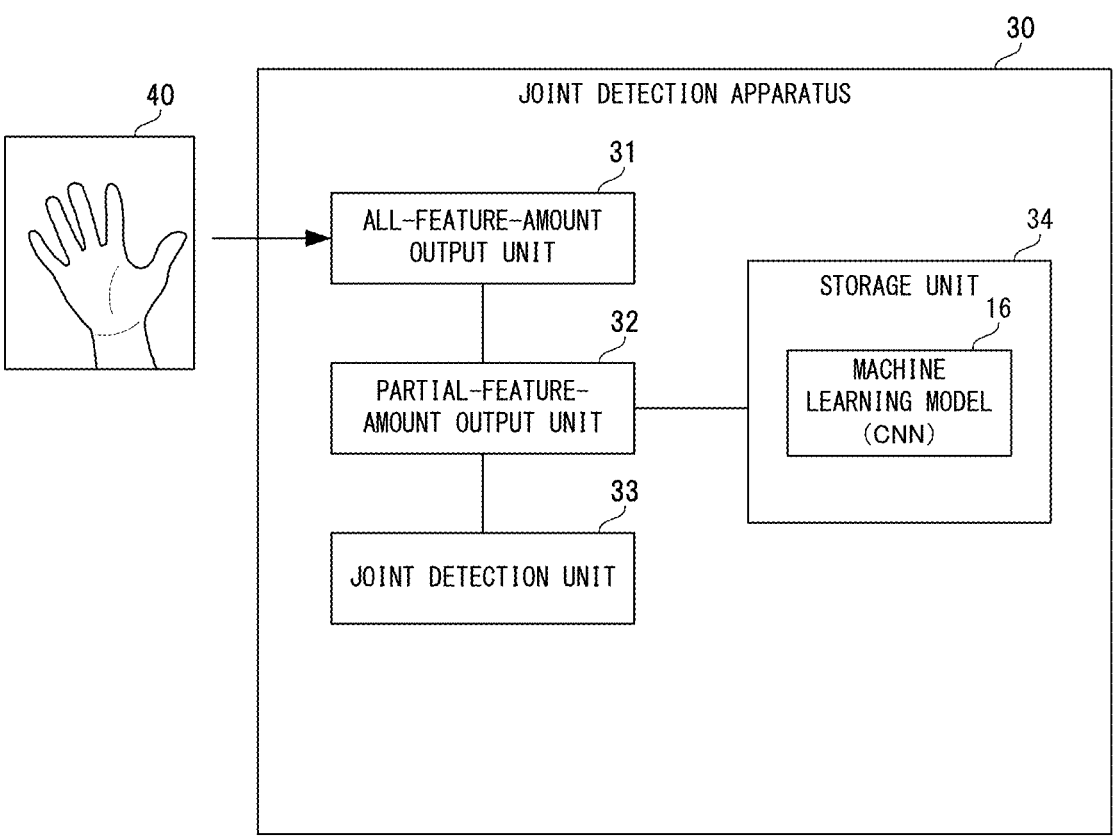
FIG. 7 is a diagram illustrating the configuration of the joint detection apparatus in the second example embodiment in detail.
Figure 8:
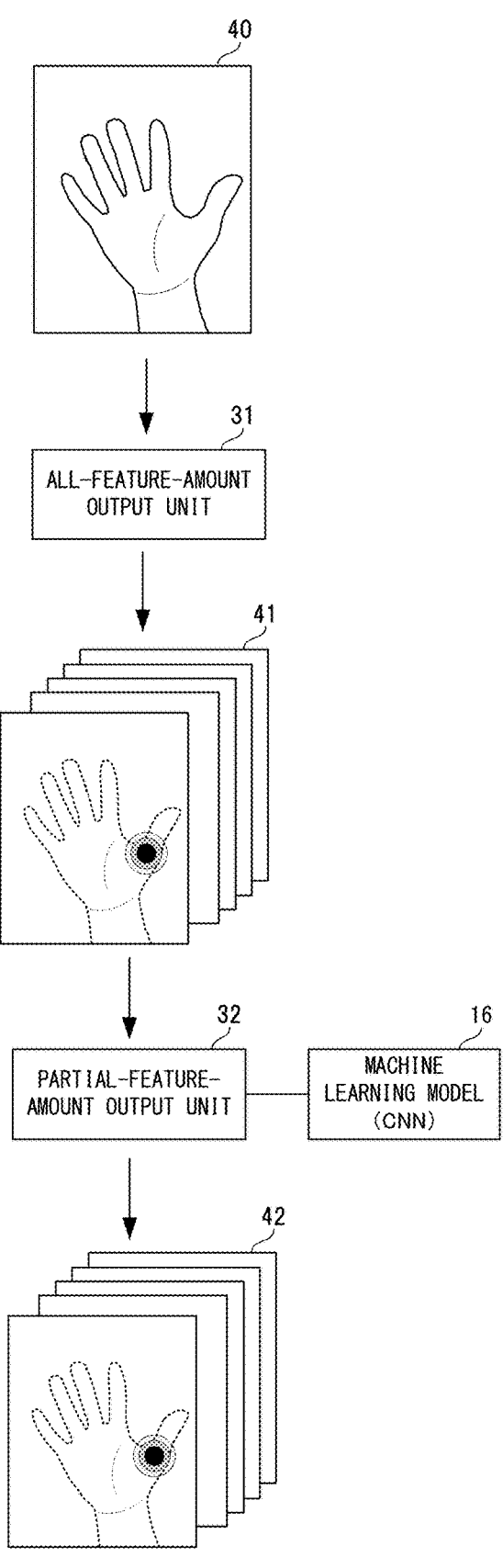
FIG. 8 is a diagram describing the functions of the all-feature-amount output unit and the partial-feature-amount output unit in the second example embodiment.

Subsequently, the configuration and functions of a joint detection apparatus 30 in the second example embodiment will be described in detail with reference to FIGS. 7 and 8. FIG. 7 is a diagram illustrating the configuration of the joint detection apparatus in the second example embodiment in detail. FIG. 8 is a diagram describing the functions of the all-feature-amount output unit and the partial-feature-amount output unit in the second example embodiment.

As illustrated in FIG. 7, in the second example embodiment, the joint detection apparatus includes a joint detection unit 33 and a storage unit 34 in addition to the all-feature-amount output unit 31 and the partial-feature-amount output unit 32 described above. The storage unit 34 stores the CNN 16 illustrated in FIG. 2 in the first example embodiment.

Also in the second example embodiment, description will be provided taking as an example a case in which the object is a human hand. Note that, also in the second example embodiment, the object from which joints are detected is not limited to a human hand, and may be an entire human body or other parts. Furthermore, as long as the object from which joints are detected has joints, the object may be an object other than a human, such as a robot for example. Furthermore, also in the second example embodiment, portions other than joints (e.g., characteristic portions such as fingertips) may be detected in addition to joints.

In addition, also in the second example embodiment, heat maps are used as feature amounts. Note that, also in the second example embodiment, feature amounts other than heat maps, such as coordinate values for example, may be used.

The all-feature-amount output unit 31 has the same functions as those in the first example embodiment, and first acquires image data 40 of an object. Then, from the image data 40, the all-feature-amount output unit 31 outputs first heat maps 41 as first feature amounts representing joints, as illustrated in FIG. 8. Furthermore, in the example in FIG. 8, a plurality of first heat maps 41 for individual joints in the image data 40 are output.

Specifically, similarly to the all-feature-amount output unit 11 described in the first example embodiment, the all-feature-amount output unit 31 also outputs first heat maps 41 by using a machine learning model that has learned the relationships between heat maps and joints in images, and inputting image data to this machine learning model, for example. A CNN can be mentioned as the machine learning model to be used in this case as well.

In the second example embodiment, the partial-feature-amount output unit 32 inputs the first heat maps 41 of the individual joints of the object, which are output from the all-feature-amount output unit 31, to the CNN 16, and causes the CNN 16 to output second heat maps 42 of the individual joints of the object.

As described in the first example embodiment, the CNN 16 is a machine learning model that has performed machine learning of the positional relationships between other joints in cases in which a feature amount of a certain joint is missing. Thus, the second heat maps 42 (second feature amounts) appropriately indicate the positions of joints other than a certain joint in a case in which the certain joint is not visible.

The joint detection unit 33 acquires the second heat maps 42 of the individual joints of the hand that is the object.

Furthermore, the joint detection unit 33 detects the coordinates of each joint of the object using the second heat map 42 of the joint.

Specifically, for each joint, the joint detection unit 33 specifies a part of the second heat map 42 with highest density, and detects the two-dimensional coordinates of the specified part in the image. Furthermore, if there are a plurality of second heat maps 42 for each joint, the joint detection unit 33 specifies the two-dimensional coordinates of the part with highest density in each second heat map 42, and further calculates the average of the specified two-dimensional coordinates and sets the calculated average coordinates as the final coordinates.

[Apparatus Operations]

Figure 9:
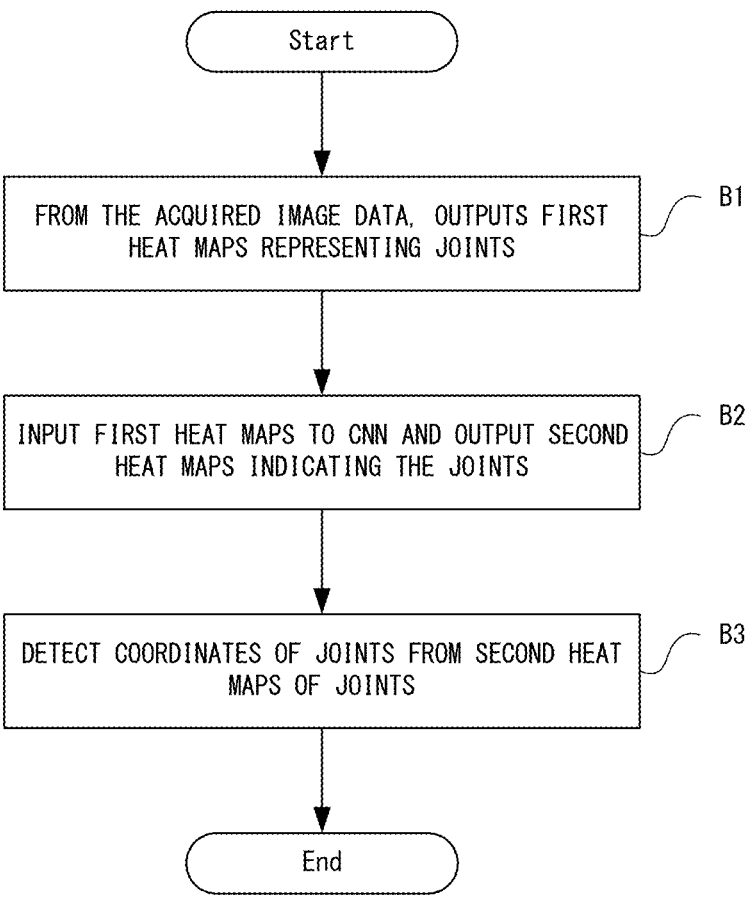
FIG. 9 is a flowchart illustrating the operations of the joint detection apparatus in the second example embodiment.

Next, operations of the joint detection apparatus 30 in the second example embodiment will be described with reference to FIG. 9. FIG. 9 is a flowchart illustrating the operations of the joint detection apparatus in the second example embodiment. FIGS. 6 to 8 will be referred to as needed in the following description. Furthermore, in the second example embodiment, a joint detection method is implemented by causing the joint detection apparatus 30 to operate. Accordingly, the following description of the operations performed by the joint detection apparatus is substituted for the description of the joint detection method in the second example embodiment.

As illustrated in FIG. 9, the all-feature-amount output unit 31 first acquires image data 40 of an object, and, from the acquired image data 40, outputs first heat maps 41 as feature amounts representing joints (step B1).

Next, the partial-feature-amount output unit 32 inputs the first heat maps 41 output in step B1 to the CNN 16, and causes the CNN 16 to output second heat maps 42 indicating the joints (step B2).

Next, from the second heat maps 42 of the individual joints output in step B2, the joint detection unit 33 detects the coordinates of the joints of the object (step B3).

As described above, in the second example embodiment, first heat maps 41 acquired from image data are input to the CNN 16. The second heat maps 42 can appropriately indicate the positions of joints other than a certain joint in a case in which the certain joint is not visible because the CNN 16 has performed machine learning of the positional relationships between joints other than the certain joint. Thus, according to the second example embodiment, the accuracy of the estimation of the positions of joints of an object is improved.

[Program]

It suffices for the program for detecting joints in the second example embodiment to be a program that causes a computer to carry out steps B1 to B3 illustrated in FIG. 9. By installing this program on a computer and executing the program, the joint detection apparatus and the joint detection method in the second example embodiment can be realized. In this case, one or more processors of the computer function and perform processing as the all-feature-amount output unit 31, the partial-feature-amount output unit 32 and the joint detection unit 33.

Furthermore, in the first example embodiment, the storage unit 34 may be realized by storing data files constituting the storage unit 34 in a storage device such as a hard disk provided in the computer, or may be realized by a storage device provided in another computer. Furthermore, besides a general-purpose PC, a smartphone and a tablet-type terminal device can be mentioned as examples of the computer.

The program for detecting joints in the second example embodiment may be executed by a computer system constructed from a plurality of computers. In this case, the computers may each function as one of the all-feature-amount output unit 31, the partial-feature-amount output unit 32 and the joint detection unit 33.

[Physical Configuration]

Figure 10:
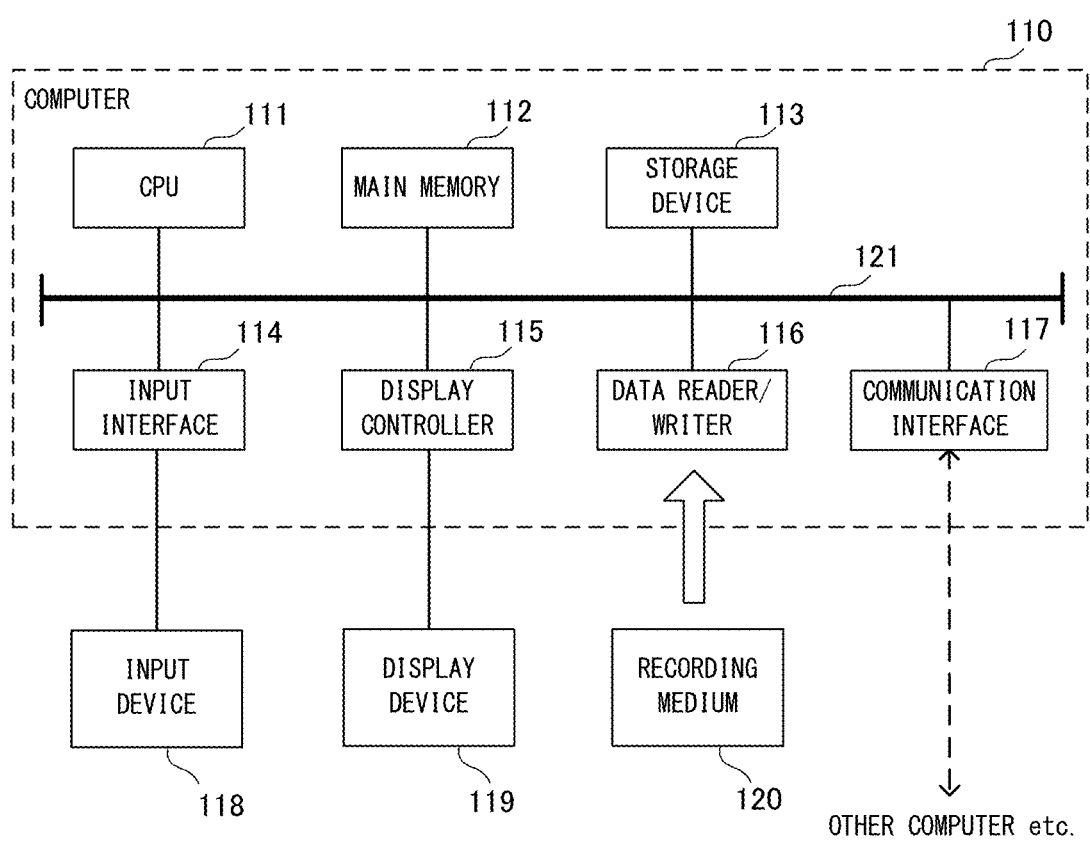
FIG. 10 is a block diagram illustrating an example of a computer that realizes the learning-model generation apparatus according to the first example embodiment and the joint detection apparatus according to the second example embodiment.

Using FIG. 10, the following describes a computer that realizes the learning-model generation apparatus 10 by executing the program according to the first example embodiment and a computer that realize the joint detection apparatus 30 by executing the program according to the second example embodiment. FIG. 10 is a block diagram illustrating an example of a computer that realizes the learning-model generation apparatus according to the first example embodiment and the joint detection apparatus according to the second example embodiment.

As shown in FIG. 10, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121.

The computer 110 may include a GPU (Graphics Processing Unit) or an FPGA (Field-Programmable Gate Array) in addition to the CPU 111, or in place of the CPU 111. In this case, the GPU or the FPGA can execute the program according to the example embodiment.

The CPU 111 deploys the program according to the example embodiment, which is composed of a code group stored in the storage device 113 to the main memory 112, and carries out various types of calculation by executing the codes in a predetermined order. The main memory 112 is typically a volatile storage device, such as a DRAM (dynamic random-access memory).

Also, the program according to the example embodiment is provided in a state where it is stored in a computer-readable recording medium 120. Note that the program according to the example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input device 118, such as a keyboard and a mouse. The display controller 115 is connected to a display device 119, and controls display on the display device 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include: a general-purpose semiconductor storage device, such as CF (CompactFlash®) and SD (Secure Digital); a magnetic recording medium, such as a flexible disk; and an optical recording medium, such as a CD-ROM (Compact Disk Read Only Memory).

Note that the learning-model generation apparatus 10 and the joint detection apparatus 30 can also be realized by using items of hardware, such as a circuit that respectively correspond to the components rather than the computer in which the program is installed. Furthermore, a part of the learning-model generation apparatus 10 may be realized by the program, and the remaining part of the learning-model generation apparatus 10 may be realized by hardware. And a part of the joint detection apparatus 30 may be realized by the program, and the remaining part of the joint detection apparatus 30 may be realized by hardware.

A part or an entirety of the above-described example embodiment can be represented by (Supplementary Note 1) to (Supplementary Note 21) described below but is not limited to the description below.

(Supplementary Note 1)

A joint detection apparatus comprising:

an all-feature-amount-outputting unit that outputs, from image data of an object and for each joint of the object, a first feature amount representing the joint; and a partial-feature-amount-outputting unit that receives input of the first feature amounts of the individual joints of the object, and, for each joint of the object, outputs a second feature amount representing the joint using a machine learning model that has performed machine learning of positional relationships between other joints in cases in which a feature amount of a certain joint is missing.

(Supplementary Note 2)

The joint detection apparatus according to Supplementary Note 1 further comprising a joint-detecting unit that detects coordinates of the joints of the object using the second feature amounts of the individual joints of the object.

(Supplementary Note 3)

The joint detection apparatus according to Supplementary Note 1 or 2, wherein the partial-feature-amount-outputting unit receives input of the first feature amounts of the individual joints of the object, and, for each joint of the object, outputs a second feature amount representing the joint using a machine learning model that has performed, for each of a plurality of the certain joints, machine learning of positional relationships between other joints in a case in which a feature amount of the certain joint is missing.

(Supplementary Note 4)

The joint detection apparatus according to any one of Supplementary Notes 1 to 3, wherein the machine learning model is constructed using a convolutional neural network, and each of the first feature amount and the second feature amount includes a heat map representing a likelihood that a joint in the image is present.

(Supplementary Note 5)

A learning-model generation apparatus comprising:

an all-feature-amount-outputting unit that outputs, from image data of an object and for each joint of the object, a feature amount representing the joint;

a feature-amount-generating unit that generates, from the feature amounts of the individual joints of the object and as training feature amounts, feature amounts in a case in which the feature amount of a certain joint is missing; and a learning-model-generating unit that, by using training data including the generated training feature amounts, generates a machine learning model by machine-learning positional relationships between the other joints in the case in which the feature amount of the certain joint is missing.

(Supplementary Note 6)

The learning-model generation apparatus according to Supplementary Note 5, wherein, from the feature amounts of the individual joints of the object, the feature-amount-generating unit generates, as a training feature amount set for each of a plurality of certain joints, a set of feature amounts in a case in which only the feature amount of the certain joint is missing, and the learning-model-generating unit generates the machine learning model by performing, for each of the plurality of certain joints, machine learning of positional relationships between the other joints in a case in which the feature amount of the certain joint is missing using training data including the corresponding training feature amount set.

(Supplementary Note 7)

The learning-model generation apparatus according to Supplementary Note 5 or 6, wherein the machine learning model is constructed using a convolutional neural network, the feature amount includes a heat map representing a likelihood that a joint in the image is present, and the feature-amount-generating unit sets the feature amount to a missing state by setting data on the heat map to 0 or 1.

(Supplementary Note 8)

A joint detection method comprising:

an all-feature-amount-outputting step of outputting, from image data of an object and for each joint of the object, a first feature amount representing the joint; and a partial-feature-amount-outputting step of receiving input of the first feature amounts of the individual joints of the object, and, for each joint of the object, outputting a second feature amount representing the joint using a machine learning model that has performed machine learning of positional relationships between other joints in cases in which a feature amount of a certain joint is missing.

(Supplementary Note 9)

The joint detection method according to Supplementary Note 8 further comprising a joint-detecting step of detecting coordinates of the joints of the object using the second feature amounts of the individual joints of the object.

(Supplementary Note 10)

The joint detection method according to Supplementary Note 8 or 9, wherein, in the partial-feature-amount-outputting step, input of the first feature amounts of the individual joints of the object is received, and, for each joint of the object, a second feature amount representing the joint is output using a machine learning model that has performed, for each of a plurality of the certain joints, machine learning of positional relationships between other joints in a case in which a feature amount of the certain joint is missing.

(Supplementary Note 11)

The joint detection method according to any one of Supplementary Notes 8 to 10, wherein the machine learning model is constructed using a convolutional neural network, and each of the first feature amount and the second feature amount includes a heat map representing a likelihood that a joint in the image is present.

(Supplementary Note 12)

A learning-model generation method comprising:

an all-feature-amount-outputting step of outputting, from image data of an object and for each joint of the object, a feature amount representing the joint;

a feature-amount-generating step of generating, from the feature amounts of the individual joints of the object and as training feature amounts, feature amounts in a case in which the feature amount of a certain joint is missing; and a learning-model-generating step of, by using training data including the generated training feature amounts, generating a machine learning model by machine-learning positional relationships between the other joints in the case in which the feature amount of the certain joint is missing.

(Supplementary Note 13)

The learning-model generation method according to Supplementary Note 12, wherein, in the feature-amount-generating step, as a training feature amount set for each of a plurality of certain joints, a set of feature amounts in a case in which only the feature amount of the certain joint is missing is generated from the feature amounts of the individual joints of the object, and in the learning-model-generating step, the machine learning model is generated by performing, for each of the plurality of certain joints, machine learning of positional relationships between the other joints in a case in which the feature amount of the certain joint is missing using training data including the corresponding training feature amount set.

(Supplementary Note 14)

The learning-model generation method according to Supplementary Note 12 or 13, wherein the machine learning model is constructed using a convolutional neural network, the feature amount includes a heat map representing a likelihood that a joint in the image is present, and in the feature-amount-generating step, the feature amount is set to a missing state by setting data on the heat map to 0 or 1.

(Supplementary Note 15)

A computer readable recording medium that includes a program recorded thereon, the program including instructions that cause a computer to carry out:

an all-feature-amount-outputting step of outputting, from image data of an object and for each joint of the object, a first feature amount representing the joint; and a partial-feature-amount-outputting step of receiving input of the first feature amounts of the individual joints of the object, and, for each joint of the object, outputting a second feature amount representing the joint using a machine learning model that has performed machine learning of positional relationships between other joints in cases in which a feature amount of a certain joint is missing.

(Supplementary Note 16)

The computer readable recording medium according to Supplementary Note 15, wherein the program further includes instructions that cause the computer to carry out a joint-detecting step of detecting coordinates of the joints of the object using the second feature amounts of the individual joints of the object.

(Supplementary Note 17)

The computer readable recording medium according to Supplementary Note 15 or 16, wherein, in the partial-feature-amount-outputting step, input of the first feature amounts of the individual joints of the object is received, and, for each joint of the object, a second feature amount representing the joint is output using a machine learning model that has performed, for each of a plurality of the certain joints, machine learning of positional relationships between other joints in a case in which a feature amount of the certain joint is missing.

(Supplementary Note 18)

The computer readable recording medium according to any one of Supplementary Notes to 17, wherein the machine learning model is constructed using a convolutional neural network, and each of the first feature amount and the second feature amount includes a heat map representing a likelihood that a joint in the image is present.

(Supplementary Note 19)

A computer readable recording medium that includes a program recorded thereon, the program including instructions that cause a computer to carry out:

an all-feature-amount-outputting step of outputting, from image data of an object and for each joint of the object, a feature amount representing the joint;

a feature-amount-generating step of generating, from the feature amounts of the individual joints of the object and as training feature amounts, feature amounts in a case in which the feature amount of a certain joint is missing; and a learning-model-generating step of, by using training data including the generated training feature amounts, generating a machine learning model by machine-learning positional relationships between the other joints in the case in which the feature amount of the certain joint is missing.

(Supplementary Note 20)

The computer readable recording medium according to Supplementary Note 19, wherein, in the feature-amount-generating step, as a training feature amount set for each of a plurality of certain joints, a set of feature amounts in a case in which only the feature amount of the certain joint is missing is generated from the feature amounts of the individual joints of the object, and in the learning-model-generating step, the machine learning model is generated by performing, for each of the plurality of certain joints, machine learning of positional relationships between the other joints in a case in which the feature amount of the certain joint is missing using training data including the corresponding training feature amount set.

(Supplementary Note 21)

The computer readable recording medium according to Supplementary Note 19 or 20, wherein the machine learning model is constructed using a convolutional neural network, the feature amount includes a heat map representing a likelihood that a joint in the image is present, and in the feature-amount-generating step, the feature amount is set to a missing state by setting data on the heat map to 0 or 1.

Although the invention of the present application has been described above with reference to the example embodiment, the invention of the present application is not limited to the above-described example embodiment. Various changes that can be understood by a person skilled in the art within the scope of the invention of the present application can be made to the configuration and the details of the invention of the present application.

This application is based upon and claims the benefit of priority from Japanese application No. 2021-029411 filed on Feb. 26, 2021, the disclosure of which is incorporated herein in its entirety by reference.

INDUSTRIAL APPLICABILITY

According to the invention, it is possible to improve the accuracy of the estimation of joint positions. The present invention is useful in fields that require posture detection of objects having joints, such as humans and robots. Specific fields include video surveillance and user interfaces.

REFERENCE SIGNS LIST

10 Learning-model generation apparatus (first example embodiment)
11 All-feature-amount output unit
12 Feature-amount generation unit
13 Learning-model generation unit
14 Random-number generation unit 14
15 Storage unit
16 Machine learning model
20 Image data
21 heat map
22 training feature amount set
25 joint detection apparatus (second example embodiment)
31 All-feature-amount output unit
32 Partial-feature-amount output unit
33 Joint detection unit
34 Storage unit
40 Image data (detection target)
41 First heat maps
42 Second heat maps
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A joint detection apparatus comprising:

at least one memory storing instructions; and at least one processor configured to execute the instructions to:

output, from image data of an object and for each joint of the object, a first feature amount representing the joint; and receive input of the first feature amounts of the individual joints of the object, and, for each joint of the object, output a second feature amount representing the joint using a machine learning model that has performed machine learning of positional relationships between other joints in cases in which a feature amount of a certain joint is missing, wherein the machine learning model is constructed using a convolutional neural network, and wherein each of the first feature amount and the second feature amount includes a heat map representing a likelihood that a joint in the image is present.

2. The joint detection apparatus according to claim 1, wherein the at least one processor is further configured to execute the instructions to:

detect coordinates of the joints of the object using the second feature amounts of the individual joints of the object.

3. The joint detection apparatus according to claim 1, wherein the at least one processor is further configured to execute the instructions to:

receive input of the first feature amounts of the individual joints of the object, and, for each joint of the object, output a second feature amount representing the joint using a machine learning model that has performed, for each of a plurality of the certain joints, machine learning of positional relationships between other joints in a case in which a feature amount of the certain joint is missing.

4. A joint detection method comprising:

outputting, from image data of an object and for each joint of the object, a first feature amount representing the joint; and receiving input of the first feature amounts of the individual joints of the object, and, for each joint of the object, outputting a second feature amount representing the joint using a machine learning model that has performed machine learning of positional relationships between other joints in cases in which a feature amount of a certain joint is missing, wherein the machine learning model is constructed using a convolutional neural network, and wherein each of the first feature amount and the second feature amount includes a heat map representing a likelihood that a joint in the image is present.

5. The joint detection method according to claim 4 further comprising:

detecting coordinates of the joints of the object using the second feature amounts of the individual joints of the object.

6. The joint detection method according to claim 4, wherein, in the outputting of the partial feature amounts, input of the first feature amounts of the individual joints of the object is received, and, for each joint of the object, a second feature amount representing the joint is output using a machine learning model that has performed, for each of a plurality of the certain joints, machine learning of positional relationships between other joints in a case in which a feature amount of the certain joint is missing.

7. A computer non-transitory readable recording medium that includes a program recorded thereon, the program including instructions that cause a computer to:

output, from image data of an object and for each joint of the object, a first feature amount representing the joint; and receive input of the first feature amounts of the individual joints of the object, and, for each joint of the object, output a second feature amount representing the joint using a machine learning model that has performed machine learning of positional relationships between other joints in cases in which a feature amount of a certain joint is missing, wherein the machine learning model is constructed using a convolutional neural network, and wherein each of the first feature amount and the second feature amount includes a heat map representing a likelihood that a joint in the image is present.

8. The non-transitory computer readable recording medium according to claim 7, wherein the program further includes instructions that cause the computer to detect coordinates of the joints of the object using the second feature amounts of the individual joints of the object.

9. The non-transitory computer readable recording medium according to claim 7, wherein, in the outputting of the partial feature amounts, input of the first feature amounts of the individual joints of the object is received, and, for each joint of the object, a second feature amount representing the joint is output using a machine learning model that has performed, for each of a plurality of the certain joints, machine learning of positional relationships between other joints in a case in which a feature amount of the certain joint is missing.

\* \* \* \* \*